Patented May 1, 1923.

1,454,012

UNITED STATES PATENT OFFICE.

LEIF TORJUSEN BOLKESJÖ, OF NOTODDEN, NORWAY.

TURNING INDICATOR FOR AUTOMOBILES.

Application filed December 6, 1922. Serial No. 605,274.

*To all whom it may concern:*

Be it known that I, LEIF TORJUSEN BOLKESJÖ, a subject of the King of Norway, residing at Notodden, Norway, have invented certain new and useful Improvements in Turning Indicators for Automobiles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a turning indicator for automobiles comprising rotatable disks or the like, which may be coupled with suitable driving means and be rotated with the object of indicating the direction of the turn or the stopping of the car.

Further the invention comprises a number of features, which will be specified in the following with reference to the drawings.

Fig. 1 is a side view with parts in longitudinal section of an automobile provided with the device according to the invention.

Fig. 2 is a sectional view of a detail on a larger scale.

The device indicates the direction of driving by means of a number of rotating indicator disks 1, one or two of which are mounted on each side of the car.

For indicating a turn to the right the disk or disks on the right hand side of the car are rotated, and for indicating a turn to the left the disk or disks on the left hand side of the car are rotated.

For indicating a stopping of the car all disks are rotated simultaneously.

The indicating device may be driven in the same manner as taxameters by means of flexible shafts 2 from a main shaft motor or wheel. The disks may even be electrically driven either by means of an electric motor for each disk or by means of a common motor.

The indicator disks may be hollow in order to take up an electric lamp, the preferred form of the disks being that of a hollow lens. One side of the disks may be made of glass and the other side of metal or the like. When constructed in this manner the electrical indicator disks when rotated will emit interrupted rays of light which make them easily distinguishable.

The indicator disks may also be given different colours.

The indicator apparatus may be controlled either by hand or by foot, and the coupling for the same may be placed at any convenient place where it is easily accessible for the driver.

Fig. 2 illustrates an apparatus for automatically maintaining the driving connection for the indicator disks for a limited period and releasing the disks after a certain number of rotations have been performed. This automatic coupling apparatus as indicated comprises a tooth wheel 3, which is continually driven from the motor by means of flexible shaft 4. The flexible shafts 2 for the indicator disks on each side of the car are connected with trunnions 5 mounted in bearings, one on each side of the shaft 6 to which the wheel 3 is fixed.

On trunnions 5 there are slidably, but not rotatably mounted tooth wheels 7 which are integral with externally threaded sleeves 8 engaging the teeth of small screw wheels 9. Said screw wheels 9 are integral with ratchet wheels 10 cooperating with pawls 11, preventing said wheels from being rotated in one direction. Spring returned press buttons 12 serve to permit the operator to push sleeve 11 and tooth wheel 7 from the inactive position, as illustrated on the right hand side to the active position, as illustrated on the left hand side. In the position as illustrated on the left hand side on Fig. 2 tooth wheel 7 engages tooth wheel 3 and shaft 2 is driven so that its signal disk or disks are rotated. At the same time the screw threaded sleeve 8 is in engagement with screw wheel 11 and is thereby moved axially back towards its inoperative position, until it is out of engagement with tooth wheel 3 and comes to rest.

Although there is illustrated and specified a particular type of automatic coupling apparatuses, it will be obvious that the invention is not limited to this type of apparatuses, as a number of variations of the apparatus may be adopted without getting outside the scope of the invention as indicated in the claims.

Claims:

1. In a signalling device, a prime mover, a signal element, and power transmitting means for driving the signal element from the prime mover, said power transmitting means including a manually controlled device for connecting and disconnecting the prime mover from the signal element.

2. A signalling apparatus including a prime mover, a rotatable signal element, and power transmitting means for driving the signal element from the prime mover, said means including a manually controlled device for connecting and disconnecting the signal element from the prime mover.

3. A signalling apparatus including a prime mover, a shaft driven by said prime mover, a signal element having a shaft, an element adapted to be actuated by the operator for connecting said shafts, and means for automatically returning said last mentioned element to an inoperative position only after said signal element has rotated a predetermined number of times.

4. A signalling apparatus including a prime mover, a signal device, power transmitting means for driving said signal device from said prime mover, said means including an element adapted to be actuated by the operator for connecting the prime mover with the signal device, and a second element actuated by the prime mover for automatically disconnecting the signal device from the prime mover.

5. A signalling apparatus including a prime mover provided with a driving shaft, a driving wheel rotatable with said driving shaft, a driven wheel actuated by the driving wheel, a threaded sleeve rotatable with the driven wheel, a driven shaft actuated by the driven wheel, means adapted to be actuated by the operator for moving the driven wheel and sleeve in one direction axially of the driven shaft, a threaded wheel engaging the threads of the threaded sleeve and rotatable in a single direction only, means for preventing the threaded wheel from rotating in an opposite direction, and a signal element actuated by the driven shaft.

6. A signalling apparatus for vehicles including a driving shaft, a toothed driving wheel fixed to said driving shaft, driven wheels adapted to be actuated by the driving wheel and each provided with a threaded sleeve, driven shafts on which the driven wheels are slidably mounted but prevented from rotation relatively to the driven shafts, threaded wheels engaging the threaded sleeves and each threaded wheel capable of rotation in a single direction only, means engaging each of the threaded wheels for preventing the same from rotating in an opposite direction, spring returned push buttons adapted to be actuated by the operator for moving the sleeves and the driven wheels in a certain direction, and rotatable signal elements actuated by the driven shafts.

In testimony that I claim the foregoing as my invention, I have signed my name in presence of two subscribing witnesses.

LEIF TORJUSEN BOLKESJÖ.

Witnesses:
MOGENS BUGGE,
ELÈSE POULSSON.